United States Patent
Platzer et al.

(10) Patent No.: US 7,432,939 B1
(45) Date of Patent: Oct. 7, 2008

(54) METHOD AND APPARATUS FOR DISPLAYING PIXEL IMAGES FOR A GRAPHICAL USER INTERFACE

(75) Inventors: Andrew Platzer, Santa Clara, CA (US); Patricia J. Coleman, Montara, CA (US); Tim Wasko, High River (CA)

(73) Assignee: Apple Inc., Cupertino, CA (US)

( * ) Notice: Subject to any disclaimer, the term of this patent is extended or adjusted under 35 U.S.C. 154(b) by 445 days.

(21) Appl. No.: 10/193,423

(22) Filed: Jul. 10, 2002

(51) Int. Cl.
*G09G 5/00* (2006.01)
*G06F 17/00* (2006.01)

(52) U.S. Cl. .................................. 345/619; 715/823
(58) Field of Classification Search .............. 345/619, 345/821–823, 859, 860
See application file for complete search history.

(56) References Cited

U.S. PATENT DOCUMENTS

| | | | | |
|---|---|---|---|---|
| 5,559,942 | A * | 9/1996 | Gough et al. | 345/802 |
| 5,655,093 | A * | 8/1997 | Frid-Nielsen | 715/856 |
| 5,673,401 | A * | 9/1997 | Volk et al. | 725/139 |
| 5,805,165 | A * | 9/1998 | Thorne et al. | 715/823 |
| 5,805,167 | A * | 9/1998 | van Cruyningen | 715/808 |
| 6,067,085 | A * | 5/2000 | Modh et al. | 715/711 |
| 6,097,390 | A * | 8/2000 | Marks | 715/772 |
| 6,178,432 | B1 * | 1/2001 | Cook et al. | 715/513 |
| 6,212,577 | B1 | 4/2001 | Stern et al. | |
| 6,580,823 | B1 * | 6/2003 | Englefield et al. | 382/162 |
| 6,597,383 | B1 * | 7/2003 | Saito | 715/860 |
| 6,825,861 | B2 * | 11/2004 | Wasko et al. | 715/861 |
| 6,879,704 | B2 * | 4/2005 | Nakamura et al. | 382/103 |
| 2002/0054173 | A1 * | 5/2002 | Miller et al. | 345/860 |
| 2003/0214539 | A1 * | 11/2003 | Iwema et al. | 345/861 |

OTHER PUBLICATIONS

Macromedia Flash TechNotes (Online Document, Aug. 10, 2000).*
Franklin, D. and Brooks, P. "Book: Flash 5! Creative Web Animation".*
Microsoft® Windows NT (Copyright © 1981-1998).*
Masks 501, Online Publication (Copyright © May 9, 1998).*
Arnott, Sarah. Fading Photo Edge Mask with Gradients (Online Publication, Copyright © 2000).*

* cited by examiner

*Primary Examiner*—Ryan R Yang
(74) *Attorney, Agent, or Firm*—Blakely, Sokoloff, Taylor & Zafman LLP (57) ABSTRACT

Methods and apparatuses for displaying pixel images to provide visual-based emphasis in a graphical user interface. In one aspect of the invention, a method to display a pixel image for a Graphical User Interface (GUI) on a data processing system includes: detecting one or more outlines in a first image to generate a second image from pixel values of the first image that represents a GUI component; receiving input which indicates switching the GUI component from a first mode to a second mode; and displaying a combination of the first and second images to indicate that the GUI component is in the second mode. The combination of the first and second images shows an outlined version of the first image. In one example according to this aspect, the GUI component does not have keyboard focus in the first mode; and the GUI component has keyboard focus in the second mode.

89 Claims, 9 Drawing Sheets

METHOD AND APPARATUS FOR DISPLAYING PIXEL IMAGES FOR A GRAPHICAL USER INTERFACE

FIELD OF THE INVENTION

The invention relates to graphical user interfaces, more particularly to visual-based emphasis in graphical user interfaces.

BACKGROUND OF THE INVENTION

A Graphical User Interface (GUI) of a data processing system typically provides various visual feedbacks on a display to communicate to the user. For example, when a user drags a selected item with a cursor on a screen (e.g., pressing and holding down a mouse button when the cursor is over the selected item and moving the mouse), the GUI shows a feedback illustrating that the selected item is being dragged by the cursor on the screen. On some systems, an outline of the selected item moves with a cursor as an indication that the selected item is being dragged to a location by the cursor. For example, U.S. Pat. No. 6,212,577 describes methods to generate an outline image that represents the dragged item moving on the screen as the user drags the selected item.

Some systems provide feedbacks when a GUI component is switched from one mode to another. For example, when a GUI component is switched from a mode without keyboard focus to a mode with keyboard focus, visual-based emphasis is added. When a GUI component has keyboard focus, the GUI component is a target for keyboard inputs. In Mac OS 9 developed by Apple Computer, Inc., text edit fields and lists can get keyboard focus. A simple opaque, rectangular frame surrounding such a GUI component is used to indicate that the GUI component is in a mode with keyboard focus. In other systems, keyboard focus is indicated by a dotted rectangle around the text label of the item. An example of keyboard focus includes the rectangular frame around an "OK" button on the display. This normally tells the user that the "OK" button can be activated by pressing the "Return" or "Enter" buttons on a keyboard (in addition to being able to activate the "OK" button by selecting it with a mouse controlled cursor).

SUMMARY OF THE INVENTION

Methods and apparatuses for displaying pixel images to provide visual-based emphasis in a graphical user interface are described here.

In one aspect of the invention, a method to display a pixel image for a Graphical User Interface (GUI) on a data processing system includes: detecting one or more outlines in a first image to generate a second image from pixel values of the first image that represents a GUI component; receiving input which indicates switching the GUI component from a first mode to a second mode; and displaying a combination of the first and second images to indicate that the GUI component is in the second mode. The combination of the first and second images shows an outlined version of the first image. In one example according to this aspect, the combination of the first and second images is preferably generated by: a) displaying the second image on top of the first image; b) displaying the first image on top of the second image; or c) displaying the second image without displaying the first image. At least one portion of the second image is at least partially transparent. The outlines of the first image have arbitrary shapes. In one example, the GUI component does not have keyboard focus in the first mode; and the GUI component has keyboard focus in the second mode.

In one example, after a mask is generated from the pixel values of the first image, one or more edges in the mask are detected to detect the outlines. The detected edges are blurred to generate one or more blurred edges; and the one or more blurred edges are colorized to generate the second image. The mask is generated from comparing the pixel values with a threshold value; and each of the one or more edges indicates a boundary between a first area that has corresponding pixel values larger than the threshold value and a second area that has corresponding pixel values smaller than the threshold value. In one example, the pixel values for specifying degrees of transparency of corresponding pixels are used for generating the mask.

The present invention includes apparatuses which perform these methods, including data processing systems which perform these methods and computer readable media which when executed on data processing systems cause the systems to perform these methods.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Figure 1:
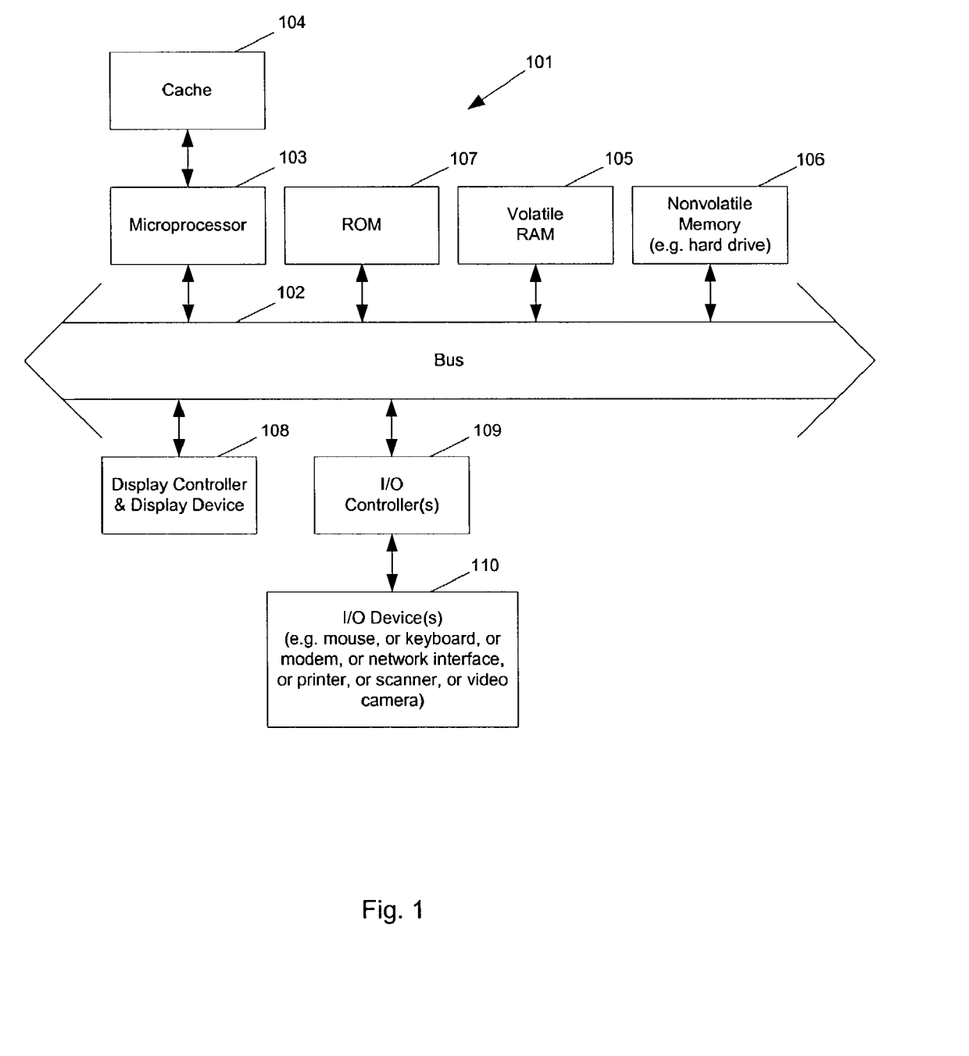
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable media can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine-readable media includes any mechanism that provides (i.e., stores and/or transmits) information in a form accessible by a machine (e.g., a computer, network device, personal digital assistant, manufacturing tool, any device with a set of one or more processors, etc.). For example, a machine-readable media includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

At least one embodiment of the present invention seeks to provide outline-based visual emphasis for an arbitrarily shaped GUT component (e.g., image, graphic, text) to indicate that the GUT component is in a special state or mode. For example, when an arbitrarily shaped GUI component (e.g., a non-rectangular control, such as rounded buttons, or a control without a text label, such as images) obtains keyboard focus, visual emphases, such as focus rings or focus boundaries or focus areas, or other indicators of a focus for an input device, generated according to methods of various embodiments of the present invention can be used to indicate the mode of keyboard focus or a focus for another input device. It is understood that a focus ring refers to not only a visual emphasis in a shape of a ring but also focus boundaries or focus areas of any arbitrary shape, or other indicators of a focus for an input device.

It will be understood that when a GUT component is switched from one mode to another, the behavior of the GUT component for interacting with a user is changed. An operation (e.g., starting to drag an item, or receiving and storing text input in a text field) that does not change the behavior of the GUT component does not change the mode of the GUT component.

In one embodiment of the present invention, a focus ring is added to a GUT component if the GUT component enters a special mode. In the graphics rasterizer, a pixel version of the GUT component, which may include image, graphics and text, is used to generate a version of the GUT component with a focus ring before it is sent to the output buffer (e.g., window buffer, or frame buffer for a screen, etc). The rasterizer gets a pointer to the pixel data and the dimensions of the data. Then, a mask, which is a black and white version of the image, is generated using a threshold value to ignore parts of the image where the amount of alpha (transparency) is below the threshold. The part of the image with the amount of alpha below the threshold is considered a "shadow." After ignoring the shadows, the mask contains a shape of the GUI component. An outline around the shape in the mask is generated by checking each pixel of the mask. For example, if the pixel is white but if at least one of the adjacent pixels to the left, right, above, or below is black, the pixel is set to black; otherwise, it is cleared to white. The single pixel outline around the outside (and inside of any holes) of the pixel image of the GUI component is then blurred in the horizontal and vertical directions. For example, library functions (e.g., in Quartz on Mac OS X) can be used to do a 2D Gaussian blur to generate a blurred outline. The blurred outline with partially transparency and smoothed corners fades away from the original outline detected from the mask. The size of the blurring is adjustable. The blurred outline is colorized to generate a focus ring for the GUI component. Based on configuration options, the focus ring is drawn before, after, or in place of the original pixel image of the GUI component pointed to by the pointer obtained by the rasterizer. The pixel image of the GUI component, outlined by the focus ring, is displayed to indicate that the GUI component is in the special mode. The color, size of blurring and opacity of the focus ring can be changed to match a user preference in the system. Animation effects can also be provided with varying parameters for generating the focus ring, such as a changing color, size of blurring and/or opacity.

The focus ring is placed around the individual GUI component (graphic, image, text) until the special mode is turned off. A number of GUI components can be combined so that the composite image for the combined GUI components is outlined. When a number of GUI components are combined, the composite image of the combined GUI components is buffered first; and then, the focus ring is generated for the composite image.

Focus rings generated according to methods of various embodiments of the present invention provide improved visual-based emphasis for arbitrarily-shaped GUI components. Aesthetically pleasing, such focus rings adding glowing outline to the arbitrarily shaped GUI components. Details are described below.

Figure 2:
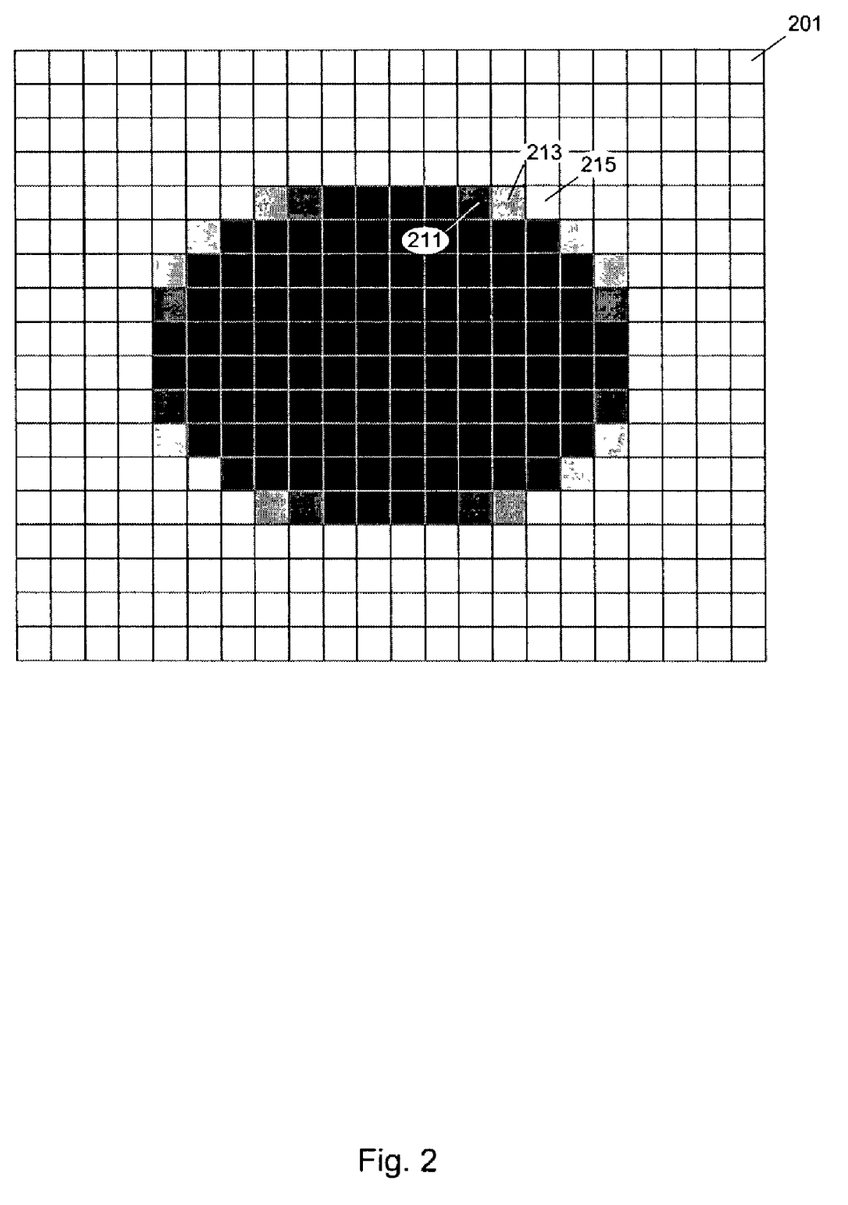
FIGS. 2-5 illustrate a method to generate a focus ring according to one embodiment of the present invention.
Figure 3:
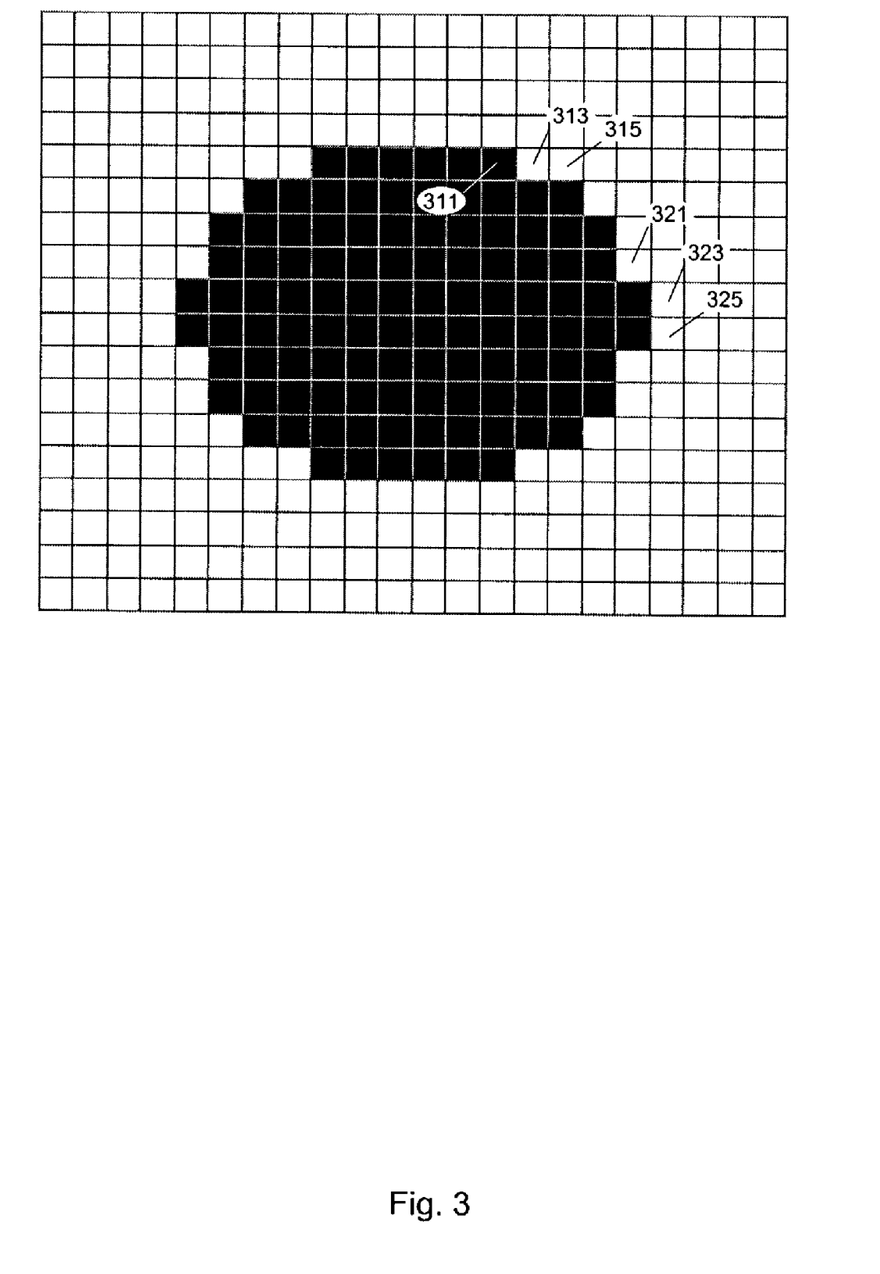
Figure 4:
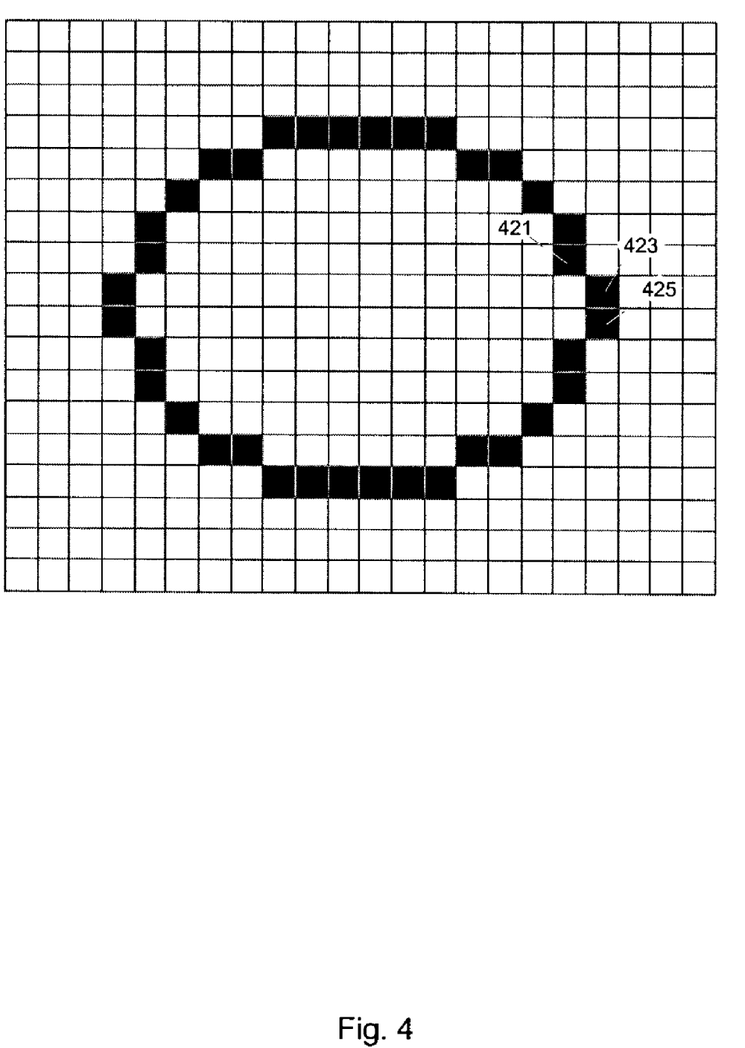

FIGS. 2-5 illustrate a method to generate a focus ring (e.g., a focus boundary, or a focus area, or other indicators of a focus for an input device) according to one embodiment of the present invention. FIG. 2 shows a pixel image representing a GUI component (e.g., a button without a text label). Each cell (e.g., cell 201) in FIGS. 2-5 represents a pixel. The gray levels represent alpha (transparency) values. A black cell represents a pixel with a solid color; and a white cell represents a transparent pixel. In FIG. 2, pixels 211-215 have different levels of transparency at the boundary of the GUI component. To precisely determine the boundary of the GUI component, a mask is generated from the alpha values of the pixels in FIG. 2. FIG. 3 illustrates a mask generated from comparing the alpha values with a threshold value. For example, since pixels 213 and 215 are more transparent than the threshold, their corresponding pixels in the mask, pixels 313 and 315, are set to be transparent. Since pixel 211 is less transparent than the threshold, its corresponding pixel in the mask, pixel 311, is set to be solid. Thus, FIG. 3 represents a black and white one-bit pixel image of the GUI component. An edge detection operation is performed on the mask to determine the boundary (or outline) of the GUI component. Each of pixels 321-325 is white in the mask of FIG. 3; and each of pixels 321-325 has at least one black adjacent pixel (to the left, right, above, or below). Thus, pixels 321-325 are determined to be on the edges of the mask. FIG. 4 illustrates the edges of the mask, where pixels 421-425 correspond to pixels 321-325 of the mask in FIG. 3. Although FIG. 4 shows only one closed outline for the GUI component, it is understood that a GUI component with one or more holes generally has more than one closed outline. The detected outline in FIG. 4 is blurred, for example, by a 2-D Gaussian blurring operation, to generate the blurred outline in FIG. 5. After the blurring operation, pixels 521-525, corresponding to pixels 421-425 on the outline, have lower degrees of transparency; and the pixels away from the outline of FIG. 4, such as pixels 531-535, have higher degrees of transparency. Thus, the blurred outline in FIG. 5 appears to be smoothed and fade away from the outline of FIG. 4. The blurred outline in FIG. 5 can be colorized. For example, a single color can be assigned to the pixels in FIG. 5 with alpha values indicated by the gray levels of the pixels. Alternative, different colors can be assigned to the non-transparent pixels in FIG. 5 according to the gray levels of the pixels.

Figure 6:
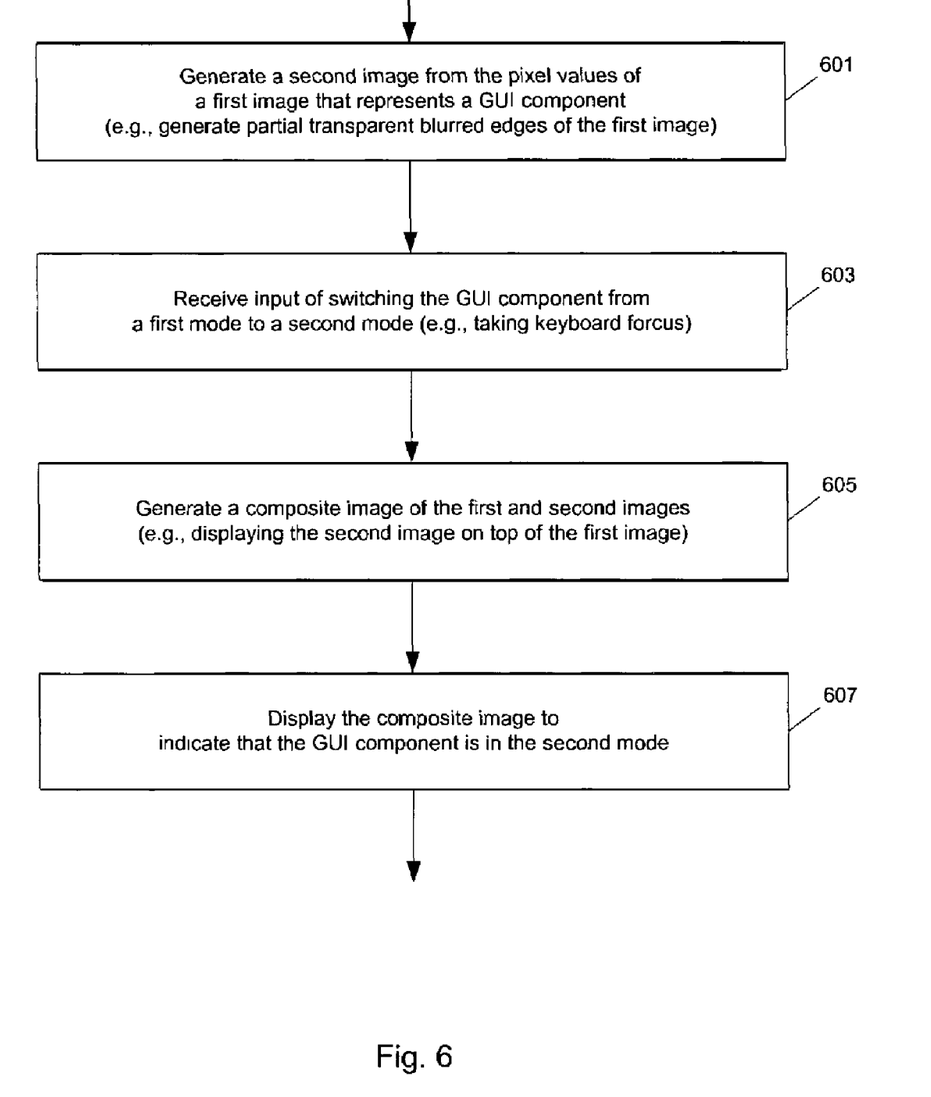
FIG. 6 shows a flow chart of a method to display a GUI component with visual-based emphasis according to one embodiment of the present invention.

FIG. 6 shows a flow chart of a method to display a GUI component with visual-based emphasis according to one embodiment of the present invention. Operation 601 generates a second image from the pixel values of a first image that represents a GUI component. For example, an image of partially transparent blurred edges of the first image is generated from detecting one or more outlines in the first image. When the first image contains one or more holes, more than one outline of the first image can be detected. After operation 603 receives input of switching the GUI component from a first mode to a second mode (e.g., after taking keyboard focus), operation 605 generates a composite image of the first and second images. For example, the second image is displayed on top of the first image, or the first image is displayed on top of the second image, to provide a visual-based emphasis for the GUI component. Operation 607 displays the composite image to indicate that the GUI component is in the second mode. When the GUI component is switched from the second mode back to the first mode, the first image is displayed for the GUI component without the second image. In one example, the second image is generated in response to receiving the input of switching the GUI component from the first mode to the second mode; in another example, the second image is cached so that the composite image can be generated after the input of mode switching is received; in another example, the composite image of the first and second images are cached, which is shown when the input of mode switching is received; in a further example, the second image is generated in response to a determination that the GUI component is in a second mode. Thus, it is understood that the operations in FIG. 6 can be performed in various different sequences; and that the second image can either be transient or be cached in various forms.

Figure 5:
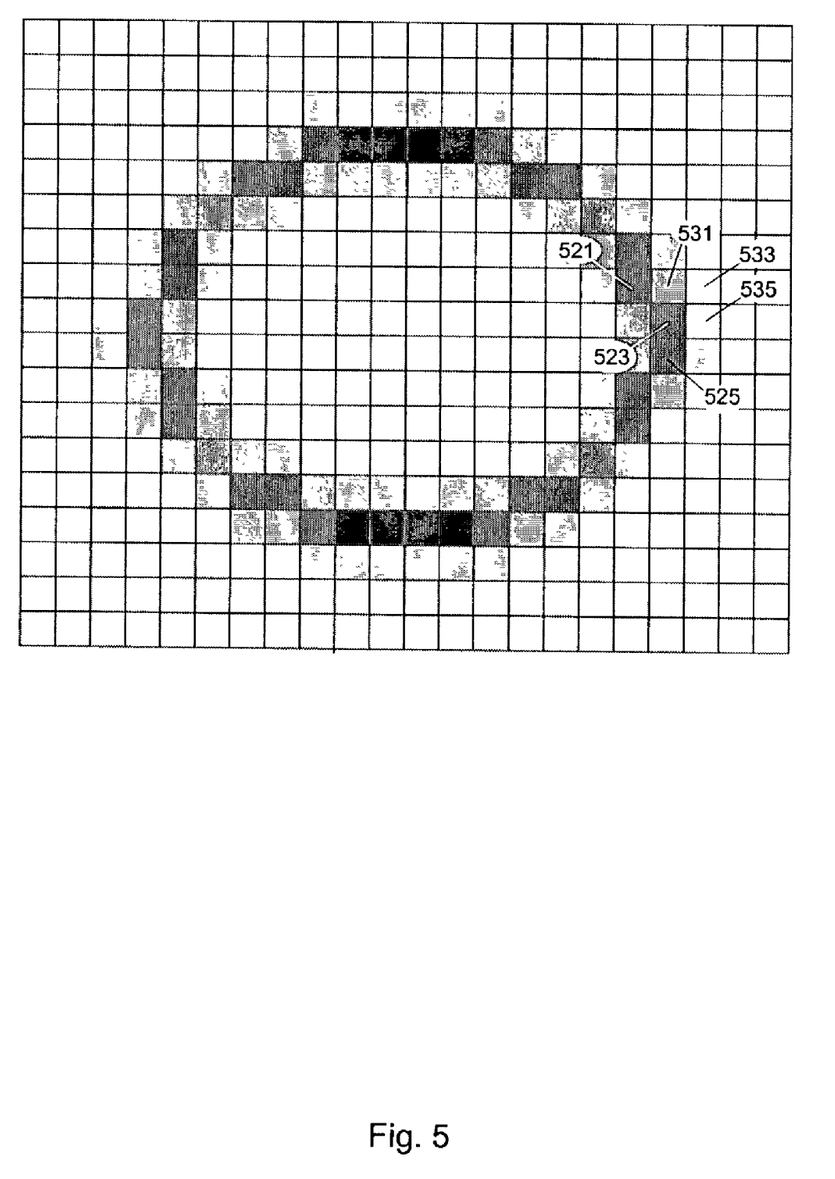
Figure 7:
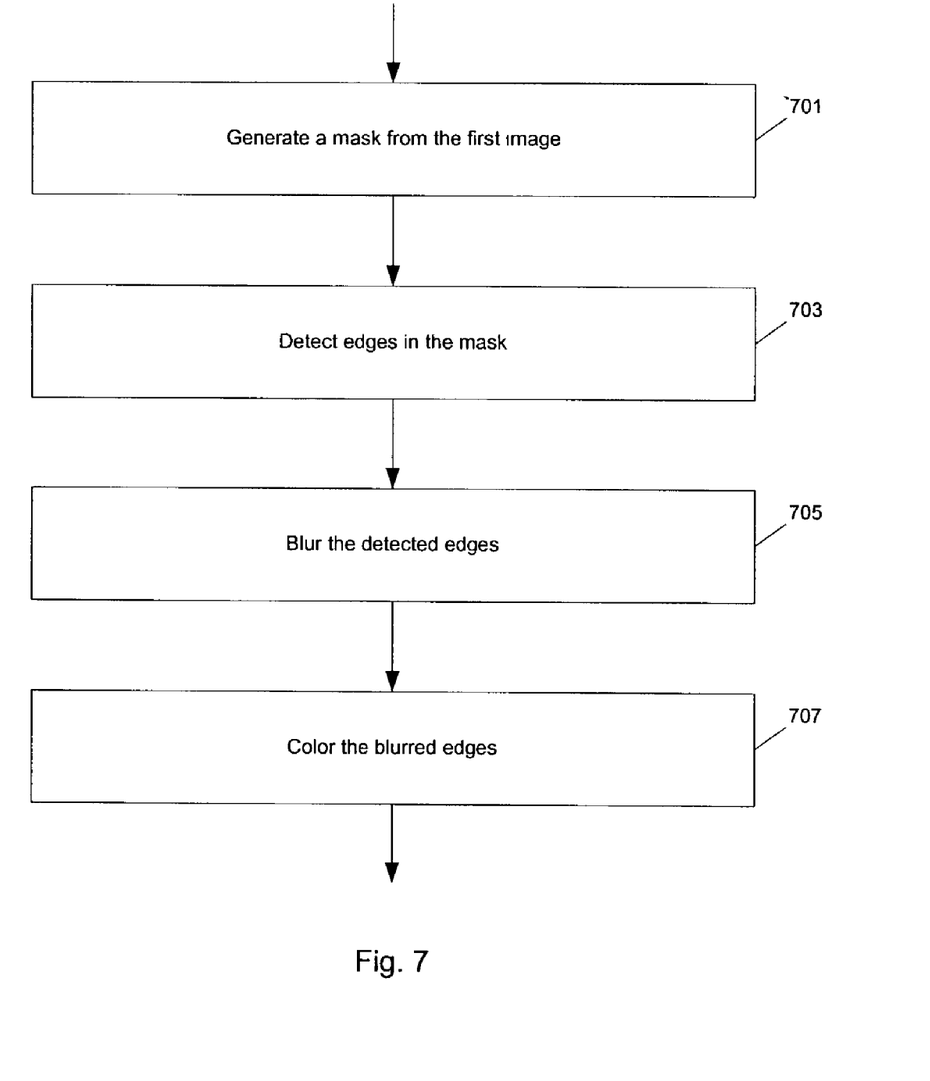
FIG. 7 shows a flow chart of a method to generate a focus ring according to one embodiment of the present invention.

FIG. 7 shows a flow chart of a method to generate a focus ring according to one embodiment of the present invention. Such a method can be performed for operation 601 in FIG. 6. Operation 701 generates a mask from the first image. The mask represents a one-bit (black and white) pixel image of the first image. From the pixel values (e.g. alpha for transparency) of the first image, the mask is generated to define a shape of the first image. For example, the mask in FIG. 3 is generated from the image in FIG. 2. A black pixel represents a pixel occupied by a shape of the first image; and a white pixel represents a pixel not occupied by the shape of the first image. Operation 703 detects edges in the mask. For example, the edges in FIG. 4 are detected from the mask in FIG. 3. Various techniques for edge detection can be used to detect the edges in the mask. For example, a pixel in an edge image is set to black if the corresponding pixel in the mask is white (or black) and at least one of the adjacent pixels to the left, right, above or below is black (or white); otherwise, the pixel is set to white. Thus, the black pixels in the edge image represent the detected edges. Other techniques include the methods described in U.S. Pat. No. 6,212,577, where the region defined by black (or white) pixels in the mask is inset or outset by a fixed number of pixels to generate a second mask; and an exclusive OR operation is performed on the original mask and the second mask to detect the edges (or outlines). Thus, the thickness of the detected edges can be a single pixel or multiple pixels. Operation 705 blurs the detected edges. For example, the blurred edge in FIG. 5 is generated from the edge in FIG. 4. In one embodiment of the present invention, library functions (e.g., in Quartz on Mac OS X) is used to perform a 2D Gaussian blur. Methods for anti-aliasing can also be used to blur the detected edges and to smooth the corners in the detected edges. The blurred edges can be used to define the alpha values for the pixels. Alternatively, alpha (transparency) values can be assigned to the pixels when blurring the edges so that the blurred edges are partially transparent. Alpha values can be assigned according to the gray level of the pixels of the blurred edges. For example, a darker pixel is less transparent than a lighter pixel; and a white pixel is transparent. Operation 707 colors the blurred edges. When the blurred edges represent the alpha values of the corresponding pixels, a single color can be used to specify the color of the blurred edges. Alternatively, various methods for mapping a gray level image to a color image can be used to convert the blurred edges to a color focus ring. For example, different grays can be converted to a color with different levels of brightness (or hue, or saturation). Different types of special effects can be generated with different coloring scheme. Thus, a typical color focus ring generated from operation 707 is an outline of the arbitrarily shaped mask with partially transparent regions and transparent regions, which can be displayed on top of the original image to provide visual-based emphasis. It is understood that operations 705 and 707 are not required to generate a focus ring for an arbitrarily shaped image; however, operations 705 and 707 typically lead to aesthetically pleasing rings. Displaying a color focus ring produced by operation 707 on top of the original image can produce the effect of colorized glow around the original image.

Figure 8:
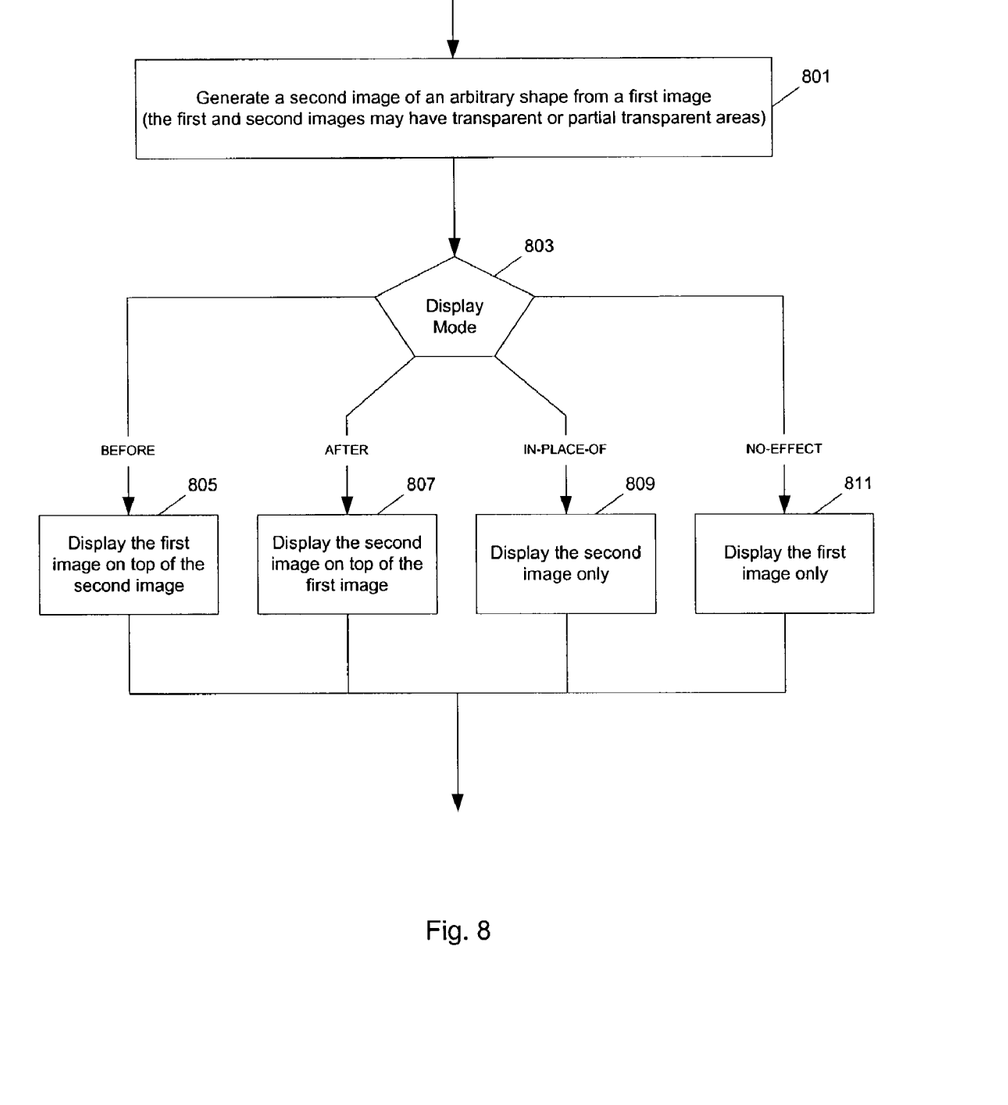
FIG. 8 shows a flow chart of a method to display a GUI component according to one embodiment of the present invention.

FIG. 8 shows a flow chart of a method to display a GUI component according to one embodiment of the present invention. Such a method can be performed for operation 605 in FIG. 6. After operation 801 generates a second image from an arbitrarily shaped first image for a GUI component (e.g., a colorized focus ring produced by the method of FIG. 7), operation 803 determines how the second image is combined with the first image to display the GUI component. If the display mode is BEFORE, the second image is displayed before the first image is displayed on top of it to generate an image representing the GUI component; if the display mode is AFTER, the second image is displayed on top of the first image after the first image is displayed to generate an image representing the GUI component; if the display mode is IN-PLACE-OF, only the second image is displayed to represent the GUI component; and if the display mode is NO-EFFECT, only the first image is displayed to represent the GUI component. Thus, a graphical user interface can use different display modes to communicate the operating mode of the GUI component to a user so that the user can interact with the GUI component according to the operating mode.

FIG. 8 illustrates some examples of display modes. Other modes for displaying the second image, or a combination of the first and second image, can also be used. Special effects, such as blinking or animation, can be used to display the combination of the first and second image and to indicate the associated mode of the GUI component (e.g., keyboard focus). For example, the second image can be broken down into a number of segments (e.g., a number segments associated with outlines or edges detected from a mask, or a number of slices in a direction, such as a horizontal, diagonal, vertical, circumferential, or a radial direction with respect to the second image or a center point, such as the center of the second image or the center of an outline, which may be closed or open); and the segments can be displayed sequentially (e.g., in a cyclical fashion) to show an animation of one segment displayed after another segment. In another example, the alpha values for transparency are scaled according to a number of factors (e.g., in a cyclical fashion) to provide visual emphases when the first and second images are overlapped with one on top of the other.

Figure 9:
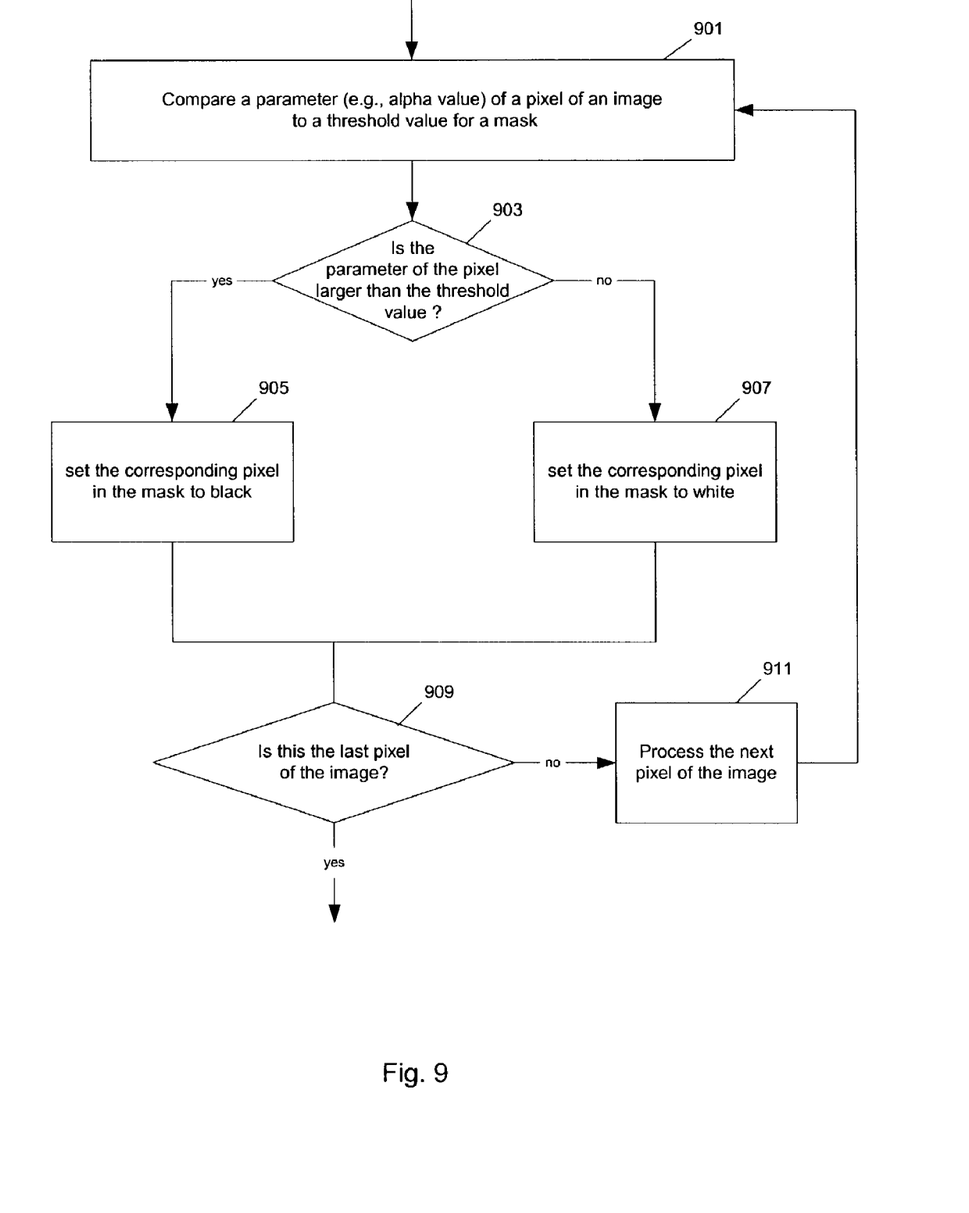
FIG. 9 shows a flow chart of a method to generate a mask according to one embodiment of the present invention.

FIG. 9 shows a flow chart of a method to generate a mask according to one embodiment of the present invention. Such a method can be performed for operation 701 in FIG. 7. Operation 901 compares a parameter of a pixel of an image to a threshold value for a mask. Such a parameter of the pixel can be the alpha value for transparency, or other parameters, such as brightness (or luminance), gray level, a color component (e.g., green of a RGB color), etc. If the parameter is larger than the threshold value, the corresponding pixel in the mask is set to black; otherwise, the corresponding pixel in the mask is set to white. Operations 909 and 911 form a loop for repeating operations 901-907 so that all pixels in the image are processed to generate the mask. After operation 909 determines that the last pixel of the image is processed, the mask has a region of black pixels that represents a shape of the image; and a region of white pixels that represents the background. When the method of FIG. 9 is used for operation 701 in FIG. 7, an edge detected in the mask in operation 703 represents the boundary between a region in the image where the pixel parameters are larger than the threshold value and a region in the image where the pixel parameters are smaller than the threshold value.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method in a Graphical User Interface (GUI) which operates on a data processing system, the method comprising:
generating a second image from pixel values of a first image which represents a GUI component, said first image being displayed in said GUI in a first mode of said data processing system, wherein pixel values, specifying a color, of the second image are generated from pixel values, specifying a color, of pixels within the shape of the first image;
switching between said first mode and a second mode of said data processing system; and
displaying a combination of the first and second images to indicate that the GUI component is in the second mode.

2. A method as in claim 1 wherein a display of the combination of the first and second images is generated by one of:
displaying the second image on top of the first image, or
displaying the first image on top of the second image, or
displaying the second image without displaying the first image.

3. A method as in claim 1 wherein the first image indicates an input for a first input device and the second image indicates another input for a second input device; and wherein the input and the another input cause the data processing system to produce the same result.

4. A method as in claim 1 wherein the combination of the first and second images represents only the GUI component.

5. A method to display a pixel image for a Graphical User Interface (GUI) on a data processing system, the method comprising:
detecting one or more outlines based on pixel values of a first image to generate a second image from pixel values of the first image, the first image representing a GUI component in a first mode, wherein pixel values, specifying a color, of the second image are generated from pixel values, specifying a color, of pixels within the shape of the first image; and
displaying a combination of the first and second images to indicate that the GUI component is in a second mode, the combination of the first and second images showing an outlined version of the first image.

6. A method as in claim 5 further comprising:
receiving input which indicates switching the GUI component from the first mode to the second mode;
wherein the combination of the first and second images is displayed in response to the input.

7. A method as in claim 5 further comprising:
determining whether or not the GUI component is in the second mode;
wherein the combination of the first and second images is displayed in response to a determination that the GUI component is in the second mode.

8. A method as in claim 4 wherein the combination of the first and second images is generated by one of:
   a) displaying the second image on top of the first image;
   b) displaying the first image on top of the second image; and
   c) displaying the second image without displaying the first image.

9. A method as in claim 8 wherein at least one portion of the second image is at least partially transparent.

10. A method as in claim 5 wherein said detecting the one or more outlines comprises:
   generating a mask from the pixel values of the first image; and
   detecting one or more edges in the mask.

11. A method as in claim 10 wherein said detecting the one or more outlines further comprises:
   blurring the one or more edges to generate one or more blurred edges.

12. A method as in claim 11 further comprising:
   coloring the one or more blurred edges to generate the second image.

13. A method as in claim 10 wherein the mask is generated from comparing the pixel values with a threshold value; and wherein each of the one or more edges indicates a boundary between a first area that has corresponding pixel values larger than the threshold value and a second area that has corresponding pixel values smaller than the threshold value.

14. A method as in claim 10 wherein the pixel values specify degrees of transparency of corresponding pixels.

15. A method as in claim 5 wherein the GUI component does not have keyboard focus in the first mode; and wherein the GUI component has keyboard focus in the second mode.

16. A method as in claim 5 wherein the one or more outlines of the first image have arbitrary shapes.

17. A machine readable media medium containing executable computer program instructions which when executed by a data processing system cause said system to perform a method in a Graphical User Interface (GUI) which operates on the data processing system, the method comprising:
   generating a second image from pixel values of a first image which represents a GUI component, said first image being displayed in said GUI in a first mode of said data processing system, wherein pixel values, specifying a color, of the second image are generated from pixel values, specifying a color, of pixels within the shape of the first image;
   switching between said first mode and a second mode of said data processing system; and
   displaying a combination of the first and second images to indicate that the GUI component is in the second mode.

18. A media as in claim 17 wherein the combination of the first and second images represents only the GUI component; and wherein the second image is automatically generated from the first image.

19. A medium as in claim 17 wherein a display of the combination of the first and second images is generated by one of:
   displaying the second image on top of the first image, or
   displaying the first image on top of the second image, or
   displaying the second image without displaying the first image.

20. A medium as in claim 17 wherein the first image indicates an input for a-first input device and the second image indicates another input for a second input device; and wherein the input and the another input cause the data processing system to produce the same result.

21. A machine readable medium containing executable computer program instructions which when executed by a data processing system cause said system to perform a method to display a pixel image for a Graphical User Interface (GUI) on the data processing system, the method comprising:
   detecting one or more outlines based on pixel values of a first image to generate a second image from pixel values of the first image, the first image representing a GUI component in a first mode, wherein pixel values, specifying a color, of the second image are generated from pixel values, specifying a color, of pixels within the shape of the first image;
   displaying a combination of the first and second images to indicate that the GUI component is in a second mode, the combination of the first and second images showing an outlined version of the first image.

22. A medium as in claim 21 wherein the method further comprises:
   receiving input which indicates switching the GUI component from the first mode to the second mode;
   wherein the combination of the first and second images is displayed in response to the input.

23. A medium as in claim 21 wherein the method further comprises:
   determining whether or not the GUI component is in the second mode;
   wherein the combination of the first and second images is displayed in response to a determination that the GUI component is in the second mode.

24. A medium as in claim 21 wherein the combination of the first and second images is generated by one of:
   a) displaying the second image on top of the first image;
   b) displaying the first image on top of the second image; and
   c) displaying the second image without displaying the first image.

25. A medium as in claim 24 wherein at least one portion of the second image is at least partially transparent.

26. A medium as in claim 21 wherein said detecting the one or more outlines comprises:
   generating a mask from the pixel values of the first image; and
   detecting one or more edges in the mask.

27. A medium as in claim 26 wherein said detecting the one or more outlines further comprises:
   blurring the one or more edges to generate one or more blurred edges.

28. A medium as in claim 27 wherein the method further comprises:
   coloring the one or more blurred edges to generate the second image.

29. A medium as in claim 26 wherein the mask is generated from comparing the pixel values with a threshold value; and wherein each of the one or more edges indicates a boundary between a first area that has corresponding pixel values larger than the threshold value and a second area that has corresponding pixel values smaller than the threshold value.

30. A medium as in claim 26 wherein the pixel values specify degrees of transparency of corresponding pixels.

31. A medium as in claim 21 wherein the GUI component does not have keyboard focus in the first mode; and wherein the GUI component has keyboard focus in the second mode.

32. A medium as in claim 21 wherein the one or more outlines of the first image have arbitrary shapes.

33. A data processing system with a Graphical User Interface (GUI), the data processing system comprising:

means for generating a second image from pixel values of a first image which represents a GUI component, said first image being displayed in said GUI in a first mode of said data processing system, wherein pixel values, specifying a color, of the second image are generated from pixel values, specifying a color, of pixels within the shape of the first image;

means for switching between said first mode and a second mode of said data processing system; and means for displaying a combination of the first and second images to indicate that the GUI component is in the second mode.

34. A data processing system as in claim 33 wherein a display of the combination of the first and second images is generated by one of:

displaying the second image on top of the first image, or displaying the first image on top of the second image, or displaying the second image without displaying the first image.

35. A data processing system as in claim 33 wherein the first image indicates an input for a first input device and the second image indicates another input for a second input device; and wherein the input and the another input cause the data processing system to produce the same result.

36. A data processing system as in claim 33 wherein the combination of the first and second images represents only the GUI component.

37. A data processing system to display a pixel image for a Graphical User Interface (GUI), the data processing system comprising:

means for detecting one or more outlines based on pixel values of a first image to generate a second image from pixel values of the first image, the first image representing a GUI component in a first mode, wherein pixel values, specifying a color, of the second image are generated from pixel values, specifying a color, of pixels within the shape of the first image;

means for displaying a combination of the first and second images to indicate that the GUI component is in a second mode, the combination of the first and second images showing an outlined version of the first image.

38. A data processing system as in claim 37 further comprising:

means for receiving input which indicates switching the GUI component from the first mode to the second mode;

wherein the combination of the first and second images is displayed in response to the input.

39. A data processing system as in claim 37 further comprising:

means for determining whether or not the GUI component is in the second mode;

wherein the combination of the first and second images is displayed in response to a determination that the GUI component is in the second mode.

40. A data processing system as in claim 37 wherein the combination of the first and second images is generated by one of:

a) displaying the second image on top of the first image;
b) displaying the first image on top of the second image; and
c) displaying the second image without displaying the first image.

41. A data processing system as in claim 40 wherein at least one portion of the second image is at least partially transparent.

42. A data processing system as in claim 37 wherein said means for detecting the one or more outlines comprises:

means for generating a mask from the pixel values of the first image; and means for detecting one or more edges in the mask.

43. A data processing system as in claim 42 wherein said means for detecting the one or more outlines further comprises:

means for blurring the one or more edges to generate one or more blurred edges.

44. A data processing system as in claim 43 further comprising:

means for coloring the one or more blurred edges to generate the second image.

45. A data processing system as in claim 42 wherein the mask is generated from comparing the pixel values with a threshold value; and wherein each of the one or more edges indicates a boundary between a first area that has corresponding pixel values larger than the threshold value and a second area that has corresponding pixel values smaller than the threshold value.

46. A data processing system as in claim 42 wherein the pixel values specify degrees of transparency of corresponding pixels.

47. A data processing system as in claim 37 wherein the GUI component does not have keyboard focus in the first mode; and wherein the GUI component has keyboard focus in the second mode.

48. A data processing system as in claim 37 wherein the one or more outlines of the first image have arbitrary shapes.

49. A data processing system with a Graphical User Interface (GUI), the data processing system comprising:

a processor; and memory coupled to the processor, the memory storing a first image which is displayed in said GUI in a first mode of said data processing system, the processor generating a second image from pixel values of the first image, wherein pixel values, specifying a color, of the second image are generated from pixel values, specifying a color, of pixels within the shape of the first image, the processor switching between said first mode and a second mode of said data processing system, the processor displaying a combination of the first and second images to indicate that the GUI component is in the second mode.

50. A data processing system as in claim 49 wherein the processor generate a display of the combination of the first and second images by one of:

displaying the second image on top of the first image, or displaying the first image on top of the second image, or displaying the second image without displaying the first image.

51. A data processing system as in claim 49 wherein the first image indicates an input for a first input device and the second image indicates another input for a second input device; and wherein the input and the another input cause the data processing system to produce the same result.

52. A data processing system as in claim 49 wherein the processor generates the second image from detecting one or more outlines in the first image according to pixel values of the first image.

53. A data processing system as in claim 52 wherein the processor displays the combination of the first and second images in response to input which indicates switching the GUI component from the first mode to the second mode.

54. A data processing system as in claim 52 wherein the processor displays the combination of the first and second images in response to a determination that the GUI component is in the second mode.

55. A data processing system as in claim 52 wherein the combination of the first and second images is generated by one of:
   a) displaying the second image on top of the first image;
   b) displaying the first image on top of the second image; and
   c) displaying the second image without displaying the first image.

56. A data processing system as in claim 55 wherein at least one portion of the second image is at least partially transparent.

57. A data processing system as in claim 52 wherein the processor generates a mask from the pixel values of the first image and detects one or more edges in the mask to detect the one or more outlines.

58. A data processing system as in claim 57 wherein the processor blurs the one or more edges to generate one or more blurred edges to generate the second image.

59. A data processing system as in claim 58 wherein the processor colors the one or more blurred edges to generate the second image.

60. A data processing system as in claim 57 wherein the mask is generated from comparing the pixel values with a threshold value; and wherein each of the one or more edges indicates a boundary between a first area that has corresponding pixel values larger than the threshold value and a second area that has corresponding pixel values smaller than the threshold value.

61. A data processing system as in claim 57 wherein the pixel values specify degrees of transparency of corresponding pixels.

62. A data processing system as in claim 52 wherein the GUI component does not have keyboard focus in the first mode; and wherein the GUI component has keyboard focus in the second mode.

63. A data processing system as in claim 52 wherein the one or more outlines of the first image have arbitrary shapes.

64. A data processing system as in claim 49 wherein the combination of the first and second images represents only the GUI component; and wherein the second image is automatically generated from the first image.

65. A method to display an image for a Graphical User Interface (GUI) on a data processing system, the method comprising:
   detecting one or more outlines from a display region of a first image to generate a second image, the first image representing a GUI component in a first mode; and
   displaying a combination of the first and second images to indicate that the GUI component is in a second mode, the combination of the first and second images showing an outlined version of the first image.

66. A method as in claim 65 further comprising:
   receiving input which indicates switching the GUI component from the first mode to the second mode;
   wherein the combination of the first and second images is displayed in response to the input.

67. A method as in claim 65 wherein the combination of the first and second images is generated by one of:
   a) displaying the second image on top of the first image;
   b) displaying the first image on top of the second image; and
   c) displaying the second image without displaying the first image.

68. A method as in claim 65 wherein said detecting the one or more outlines comprises:
   generating a mask from the display region of the first image; and
   detecting one or more edges in the mask.

69. A method as in claim 65 wherein the GUI component does not have keyboard focus in the first mode; and wherein the GUI component has keyboard focus in the second mode.

70. A method as in claim 65 wherein the one or more outlines of the first image have arbitrary shapes.

71. A machine readable medium containing executable computer program instructions which when executed by a data processing system cause said system to perform a method to display an image for a Graphical User Interface (GUI) on the data processing system, the method comprising:
   detecting one or more outlines from a display region of a first image to generate a second image, the first image representing a GUI component in a first mode; and
   displaying a combination of the first and second images to indicate that the GUI component is in a second mode, the combination of the first and second images showing an outlined version of the first image.

72. A medium as in claim 71 wherein the method further comprises:
   receiving input which indicates switching the GUI component from the first mode to the second mode;
   wherein the combination of the first and second images is displayed in response to the input.

73. A medium as in claim 71 wherein the combination of the first and second images is generated by one of:
   a) displaying the second image on top of the first image;
   b) displaying the first image on top of the second image; and
   c) displaying the second image without displaying the first image.

74. A medium as in claim 71 wherein said detecting the one or more outlines comprises:
   generating a mask from the display region of the first image; and
   detecting one or more edges in the mask.

75. A medium as in claim 71 wherein the GUI component does not have keyboard focus in the first mode; and wherein the GUI component has keyboard focus in the second mode.

76. A medium as in claim 71 wherein the one or more outlines of the first image have arbitrary shapes.

77. A data processing system to display an image for a Graphical User Interface (GUI), the data processing system comprising:
   means for detecting one or more outlines from a display region of a first image to generate a second image, the first image representing a GUI component in a first mode;
   means for displaying a combination of the first and second images to indicate that the GUI component is in a second mode, the combination of the first and second images showing an outlined version of the first image.

78. A data processing system as in claim 77 further comprising:
   means for receiving input which indicates switching the GUI component from the first mode to the second mode;
   wherein the combination of the first and second images is displayed in response to the input.

79. A data processing system as in claim 77 wherein the combination of the first and second images is generated by one of:
   a) displaying the second image on top of the first image;
   b) displaying the first image on top of the second image; and
   c) displaying the second image without displaying the first image.

80. A data processing system as in claim 77 wherein said means for detecting the one or more outlines comprises:
   means for generating a mask from the display region of the first image; and
   means for detecting one or more edges in the mask.

81. A data processing system as in claim 77 wherein the GUI component does not have keyboard focus in the first mode; and wherein the GUI component has keyboard focus in the second mode.

82. A data processing system as in claim 77 wherein the one or more outlines of the first image have arbitrary shapes.

83. A method in a Graphical User Interface (GUI) which operates on a data processing system, the method comprising:
   generating a second image from values of a display region of a first image which represents a GUI component, said first image being displayed in said GUI in a first mode of said data processing system, wherein values, specifying a color, of the second image are generated from values, specifying a color, of a display region within the shape of the first image;
   switching between said first mode and a second mode of said data processing system; and
   displaying a combination of the first and second images to indicate that the GUI component is in the second mode.

84. A method as in claim 83 wherein a display of the combination of the first and second images is generated by one of:
   displaying the second image on top of the first image, or
   displaying the first image on top of the second image, or
   displaying the second image without displaying the first image.

85. A method as in claim 83 wherein the first image indicates an input for a first input device and the second image indicates another input for a second input device; and wherein the input and the another input cause the data processing system to produce the same result.

86. A machine readable medium containing executable computer program instructions which when executed by a data processing system cause said system to perform a method in a Graphical User Interface (GUI) which operates on the data processing system, the method comprising:
   generating a second image from values of a display region of a first image which represents a GUI component, said first image being displayed in said GUI in a first mode of said data processing system, wherein values, specifying a color, of the second image are generated from values, specifying a color, of a display region within the shape of the first image;
   switching between said first mode and a second mode of said data processing system; and
   displaying a combination of the first and second images to indicate that the GUI component is in the second mode.

87. A medium as in claim 86 wherein a display of the combination of the first and second images is generated by one of:
   displaying the second image on top of the first image, or
   displaying the first image on top of the second image, or
   displaying the second image without displaying the first image.

88. A medium as in claim 86 wherein the first image indicates an input for a first input device and the second image indicates another input for a second input device; and wherein the input and the another input cause the data processing system to produce the same result.

89. A data processing system with a Graphical User Interface (GUI), the data processing system comprising:
   means for generating a second image from values of a display region of a first image which represents a GUI component, said first image being displayed in said GUI in a first mode of said data processing system, wherein values, specifying a color, of the second image are generated from values, specifying a color, of a display region within the shape of the first image;
   means for switching between said first mode and a second mode of said data processing system; and
   means for displaying a combination of the first and second images to indicate that the GUI component is in the second mode.

* * * * *